(12) United States Patent
Hwang

(10) Patent No.: US 9,184,612 B2
(45) Date of Patent: Nov. 10, 2015

(54) BATTERY CHARGING CIRCUIT

(75) Inventor: Kyu Min Hwang, Gwangju (KR)

(73) Assignee: Green Powerset Co., LTD, Seoul (KR)

(*) Notice: Subject to any disclaimer, the term of this patent is extended or adjusted under 35 U.S.C. 154(b) by 113 days.

(21) Appl. No.: 13/535,644

(22) Filed: Jun. 28, 2012

(65) Prior Publication Data
US 2013/0249489 A1 Sep. 26, 2013

(30) Foreign Application Priority Data

Jun. 29, 2011 (KR) .................. 10-2011-0063670
Aug. 26, 2011 (KR) .................. 10-2011-0086001

(51) Int. Cl.
*H02J 7/00* (2006.01)

(52) U.S. Cl.
CPC ............. *H02J 7/0052* (2013.01); *H02J 7/0016* (2013.01)

(58) Field of Classification Search
CPC ............. G01R 19/16538; H02J 7/0016; H02J 7/0052; H01M 16/006
USPC .................. 320/116, 132, 134, 152, 157, 159
See application file for complete search history.

(56) References Cited

U.S. PATENT DOCUMENTS

2004/0217734 A1* 11/2004 Shum ............................ 320/116
2012/0249066 A1* 10/2012 Ichikawa ...................... 320/109

* cited by examiner

*Primary Examiner* — Vuthe Siek
(74) *Attorney, Agent, or Firm* — William Park & Associates Ltd.

(57) ABSTRACT

A battery charging circuit includes a plurality of unit batteries that are connected in series; a current path forming unit that is connected between the unit batteries and forms a charging current path to one or more unit batteries selected by one or more selection signals; a control unit that senses the charging status of each of the plurality of the unit batteries, and generates the selection signals and controls the duty ratio according to the sensing results; and a charging electricity providing unit that controls the charging voltage provided to the charging current path forming unit according to the duty ratio of the charging control pulse.

13 Claims, 2 Drawing Sheets

-PRIOR ART-

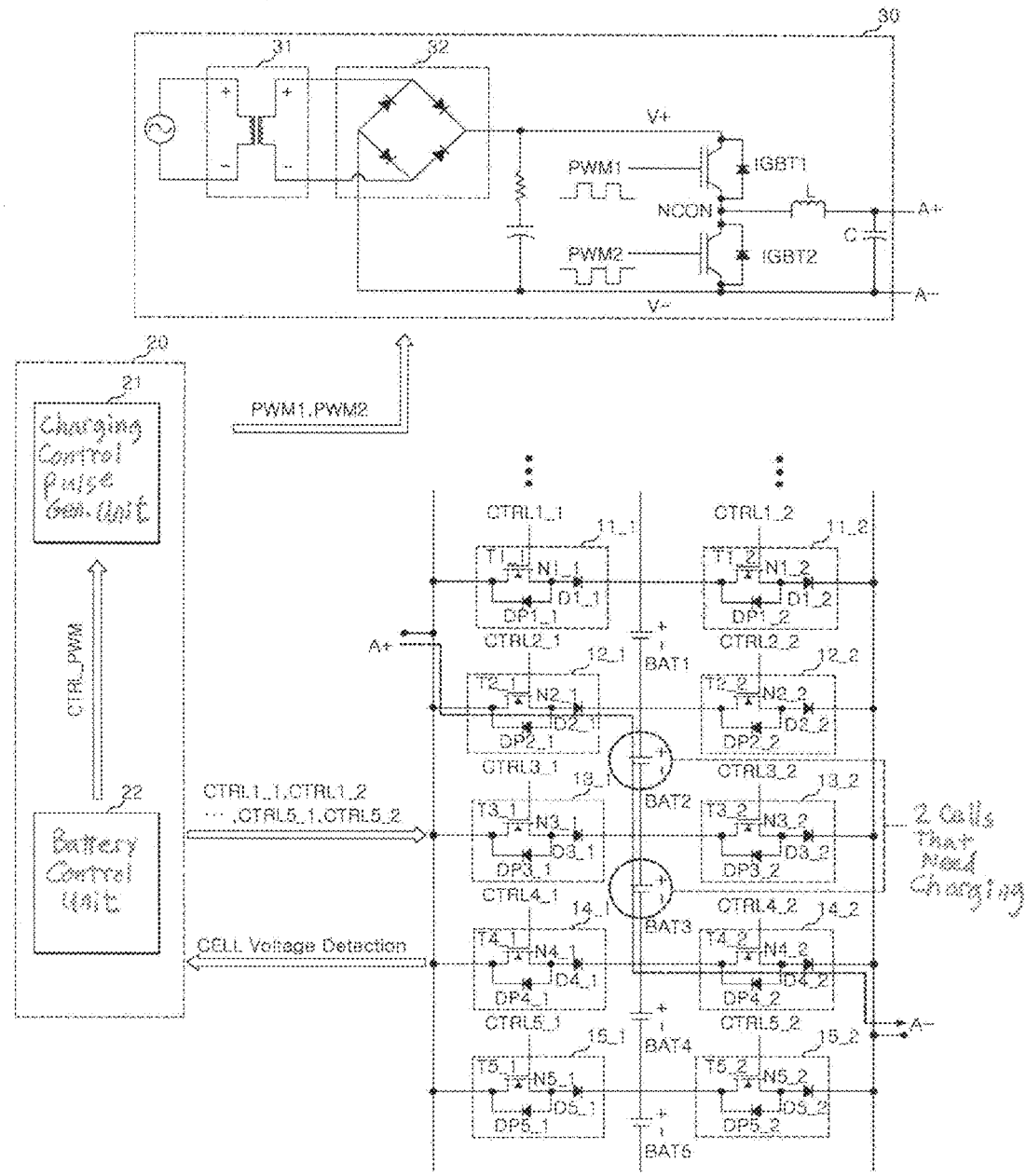

BATTERY CHARGING CIRCUIT

CROSS REFERENCE TO RELATED PATENT APPLICATION

The present application claims priority under 35 U.S.C. §119(a) to Korean application numbers 10-2011-0063670 and 10-2011-0086001, filed on Jun. 29, 2011 and Aug. 26, 2011, respectively, in the Korean Intellectual Property Office, which are incorporated herein by reference in its entirety as set forth in full

FIELD OF INVENTION

The present invention relates generally to a charging circuit of a battery pack comprised of serially connected batteries, and more particularly to cell-balancing that is capable of keeping substantially same voltage levels of the batteries during charging.

BACKGROUND

When serially connected batteries are repeatedly charged and recharged, the batteries end up with different voltage levels due to different life of the batteries. When the voltages having different voltage levels are repeatedly charged and discharged, the batteries that are more deteriorated and nearer to the useful life will tend over-charge and over-discharge during charge/discharge operations and it will accelerate the deterioration process and lower the overall performance of the battery pack. For efficient use of a battery pack, it is important to uniformly charge and discharge the serially connected batteries, and for this, the voltage levels of the batteries are kept at a same level. This is called cell-balancing, and the present invention is proposed to satisfy this need.

FIG. 1 shows the battery charging concept in accordance with general battery management system.

As shown in FIG. 1, a plurality of batteries BAT1-BAT4 are connected in series.

Between the cathode and anode terminals of each battery BAT1, BAT2, BAT3, BAT4, a current path forming part is provided. The current path forming part includes a resistor R and a switch SW, and it provides a current path when the associated battery is fully charged so as to prevent the over-charging.

Charging electricity providing unit is connected to anode of the first battery BAT1 and the cathode of the fourth battery BAT4 among the plurality of batteries BAT1-BAT4 and provides the charging electricity.

If the batteries BAT1, BAT3, BAT4 are fully charged, the switches SW1, SW3, SW4 of the current path forming parts for the batteries BAT1, BAT3, BAT4 are turned on such that the current is redirected to the associated resistors R1, R3, R4. That is, the current is bypassed to resistance for each of the fully charged batteries BAT1, BAT3, BAT4.

This type of conventional battery management system allows continuing current flow into resistance even when a battery is fully charged, and this is outputted in form of heat increasing the electricity consumed and lead to wasted energy. The energy waste gets worse as more number of fully charged batteries are present in the battery pack, and as more number of bypassed current path to resistance.

Even if the current is bypassed into the current path leading to resistance, voltage may still be applied to the fully charged battery due to leakage current to cause overcharging of the battery, and this can lead to shortened life of the battery.

Objects to Solve

The present invention provides battery charging circuit that charges a plurality of batteries by forming effective current paths.

SUMMARY OF THE INVENTION

According to an embodiment of the present invention, a battery charging circuit includes: a plurality of unit batteries that are connected in series; a current path forming unit that is connected between the unit batteries and forms a charging current path to one or more unit batteries selected by one or more selection signals; a control unit that senses the charging status of each of the plurality of the unit batteries, and generates the selection signals and controls the duty ratio according to the sensing results; and a charging electricity providing unit that controls the charging voltage provided to the charging current path forming unit according to the duty ratio of the charging control pulse.

According to another embodiment of the present invention, a battery charging circuit includes: a plurality of unit batteries that are connected in series; a charging current path forming unit that is connected between the unit batteries and forms a charging current path to one or more of unit batteries selected according to one or more of the selection signals; a battery control unit that senses the charging state of each of the plurality of the unit batteries and generates one or more selection signals according to the sensing result; a charging control pulse generation unit that controls the duty ratio of a charging control pulse according to the charging state sensed by the battery control unit; and a charge electricity providing unit that controls the voltage level of the charging voltage provided to the charging current path forming unit according to the duty ratio of the charging control pulse.

Effect of Present Invention

According to the present invention, current path is selectively formed to the battery that needs recharging, and reduction of energy consumption is achieved by reducing the unnecessary power loss.

Further, the battery life is improved since the over-charging and over-discharging of the unit batter can be prevented.

BRIEF DESCRIPTION OF THE DRAWINGS

FIG. 2 is a block diagram of battery charging circuit according to an embodiment of the present invention.

DISCLOSURE OF THE INVENTION

Figure 1:
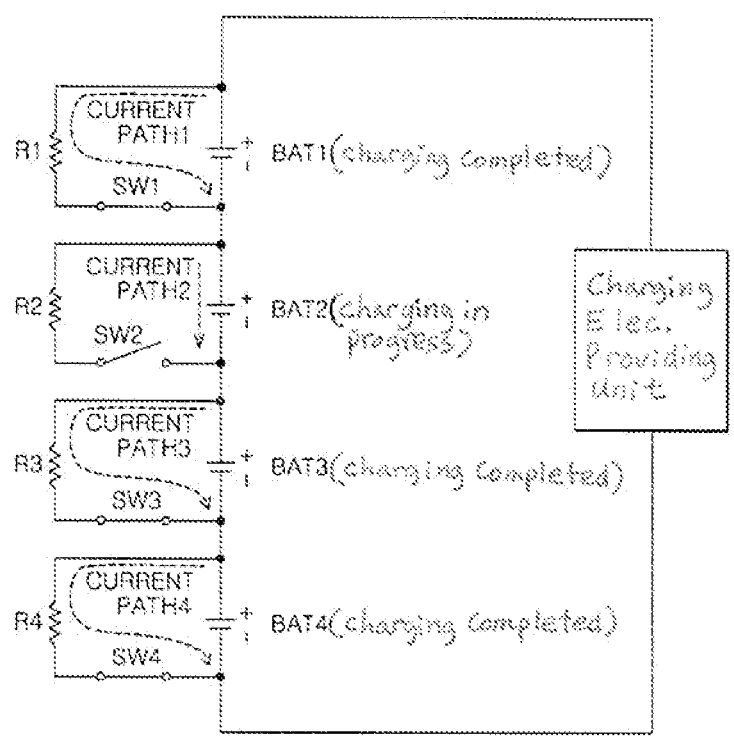
FIG. 1 illustrates the battery management system and battery charging concept.

Hereinbelow, to provide a specific description for those of ordinary skill in the related art to implement the technical concepts of the present invention, various embodiments of the present invention will be described with attached drawings.

FIG. 2 shows the battery charging circuit according to an embodiment of the present invention.

With respect to FIG. 2, the battery charging circuit is comprised of a plurality of unit batteries BAT1-BAT5, charging current path forming units 11_1-15_2, the control unit 20, and charging electricity supply unit 30.

The major operations of the above battery charging circuit are as follows according to an embodiment of the present invention.

The plurality of unit batteries are connected in series. The plurality of unit batteries can be of any type of secondary rechargeable batteries. The secondary batteries can include a lithium ion battery, a lithium polymer battery, or a lead storage battery. According to an embodiment of the present invention, a circuit with 5 unit batteries serially connected is shown, and its operation thereof will be described.

Charging current path forming unit is connected between the unit batteries and forms charging current path(s) to the selected one or more than one of the unit batteries in response to a plurality of selection signals CTRL1_1-CTRL2_5.

The charging current path forming unit according to an embodiment of the present invention comprises a plurality of current input units 11_1, 12_1, 13_1, 14_1, 15_1 and a plurality of current output units 11_2, 12_2, 13_2, 14_2, 15_2. 각 전류 유입 부는 복수의 선택신호(CTRL1_1, CTRL2_1, CTRL3_1, CTRL4_1, CTRL5_1)에 의해 선택된 제1 스위칭부(T1_1, T2_1, T3_1, T4_1, T5_1)에 의해 선제 전류의 유입이 발생하며 The current input occurs for each current input unit in response to a first switching unit T1_1, T2_1, T3_1, T4_1, T5_1 that has/have been selected by a plurality of selection signals CTRL_1, CTRL2_1, CTRL3_1, CTRL4_1, CTRL5_1, and the current output occurs for each current output unit in response to a second switching unit T1_2, T2_2, T3_2, T4_2, T5_2 that has/have been selected by a plurality of selection signals. The current input unit is connected to one terminal A+ of the charging electricity providing unit 30 and the positive terminal of each of the plurality of unit batteries. Further, the plurality of current output units are connected to another terminal A− of the charging electricity providing part 30 and the negative terminal of each of the plurality of unit batteries.

The first node N1_1, N2_1, N3_1, N4_1, N5_1 is located between the first switching unit and the first diode D1_1, D2_1, D3_1, D4_1, D5_1, and the second node N1_2, N2_2, N3_2, N4_2, N5_2 is located between the second switching unit and the second diode D1_2, D2_2, D3_3, D4_2, D5_2.

The first current input unit 11_1 among the plurality of current input units is representatively described as follows.

The first current input unit 11_1 is comprised of: a first switching unit T1_1 the controlled by a selection signal CTRL1_1 that has been allocated among the plurality of selection signals CTRL1_1-CTRL5_2; a first parasitic diode DP1_1 connected between the terminal A+ and the first node N1_1 of the charging electricity providing unit 30, and a first diode D1_1 that is connected between the first node N1_1 and the positive terminal of the selected unit battery BAT1. That is, the anode of the first diode D1_1 is connected to the first switching unit T1_1 and the cathode of the first diode D1_1 is connected to the positive terminal of the selected unit battery.

According to an embodiment of the present invention, field effect transistors FET may for example be used for the first switching unit T1_1, T2_1, T3_1, T4_1, T5_1. The internal parasitic diode characteristics of the field effect transistors are represented as the first parasitic diode DP1_1, DP2_1, DP3_1, DP4_1, DP5_1. To prevent the abnormal current flow as above due to parasitic diodes internal to the field effect transistors, the first diode D1_1, D2_1, D3_1, D4_1, D5_1 are connected as shown in FIG. 2.

That is, the diodes DP1_1, DP2_1, DP3_1, DP4_1, DP5_1 of the plurality of current input units are parasitic diodes of the field effect transistors.

The first current output unit 11_1 among the plurality of current outputs units is described as follows.

The first current output unit is comprised of: a second switching unit T1_2 that is controlled by the allocated selection signal CTRL1_2 among the plurality of selection signals CTRL1_1-CTRL5_2; a second parasitic diode DP1_2 that is connected between the second node N1_2 and the positive terminal of the unit battery BAT1; and a second diode D1_2 that is connected between the second node N1_2 and the A− terminal of the charging electricity providing unit 30. That is, the cathode of the second diode D1_2 is connected to the A− terminal of the charging electricity providing unit 30, and the anode of the second diode D1_2 is connected to the second switching unit T1_2. Further, the anode of the second parasitic diode DP1_2 is connected to the anode of the second diode D1_2, and the cathode of the second parasitic diode DP1_2 is connected to the positive terminal of the unit battery BAT1.

According to an embodiment of the present invention, the second switching unit T1_2, T2_2, T3_2, T4_2, T5_2 may for example be formed by using field effect transistors. The second parasitic diode DP1_2, DP2_2, DP3_2, DP4_2, DP5_2 represents the internal parasitic diode characteristics of the field effect transistors. To prevent the abnormal current flow due to the parasitic diode characteristics that are internal to the field effect transistors, the second diodes D1_2, D2_2, D3_2, D4_2, D5_2 are connected as shown in FIG. 2.

That is, the plurality of diodes DP1_2, DP2_2, DP3_2, DP4_2, DP5_2 among the plurality of current output units represents the internal parasitic diode characteristics of the field effect transistors.

The control unit 20 senses the charging state of each of the plurality of unit batteries, and generates a plurality of selection signals based on the sensing results, and controls the duty ratio of the charging control pulse PWM1, PWM2. For example, the control unit 20 can be formed by using a micro controller.

According to an embodiment of the present invention, the control unit 20 is comprised of a battery control unit 22 and a charging control pulse generation unit 21. The battery control unit 22 senses the charging state of each of the plurality of the unit batteries and generates a plurality of selection signals based on the sensing results.

The charging control pulse generation unit 21 controls the duty ratio of the charging control pulse PWM1, PWM2 according to the sensed charging state sensed by the battery control unit 22. The charging control pulse include a first charging control pulse PWM1 and a second charging control pulse, and the phase of these two signals are opposite with respect to each other. That is, the first charging control pulse PWM1 and the second charging control pulse PWM2 are of signals in differential form. That is, the charging control pulse generation unit 21 controls such that the duty ratio of the first charging control pulse PWM1 is greater as there are more number of unit batteries that require charging.

The second charging control pulse PWM2 has a phase that is opposite of the first charging control pulse. Thus, as the duty ratio of the first charging control pulse PWM1 is greater, the duty ratio of the second charging control pulse PWM2 becomes less.

The charging electricity providing unit 30 controls the voltage between one terminal A+ of the charging electricity providing unit 30 provided to the charging current path forming unit 11_1=15_2 and the other terminal A−.

According to an embodiment of the present invention, the charging electricity providing unit 30 is connected between a transformer 31, a rectifier 32, a first voltage terminal V+, and a converter node NCON, and includes: a first transistor IGBT1 that is controlled by the first charging control pulse PWM1; a second transistor IGBT2 that is connected between the second voltage terminal V− and the converter node NCON and is controlled by the second charging control pulse PWN2 that is inverse of the first charging control pulse PWM1; an inductor L that is connected between the converter node and the one terminal A+ of the charging electricity providing unit 30; and a smoothing capacitor C that is connected to one terminal A+ and the other terminal A− of the charging electricity providing unit 30 for removing the ripple currents due to the inductor L, As there are more batteries requiring charging, the duty ratio of the first charging control pulse PWM1 is greater, and as the duty of the first charging control pulse is greater, the voltage level of the charging voltage that is outputted by the one terminal A1 and the other terminal A− of the charging electricity providing unit 30 gets greater.

The driving voltage that is provide to the charging electricity providing unit via the first voltage terminal V+ and the second voltage terminal V− is the voltage generated through the transformer 31 and the rectifier 32. The first winding side of the transformer 31 can be connected directed to the electrical grid or connected after scaling down the AC electricity of the electric grid, and the second winding side may resemble the same shape as the AC electricity of the first winding side but may have bigger or smaller scale AC electricity. The transformer 31 may receive the AC electricity generated by the power conditioning system (PCS), and the transformer 31 may be located in PCS or BMS. Further, the first transistor IBGT1 and the second transistor IGBT2 are described as using insulated gate bipolar transistor IGBT as examples, and it is also possible to use field effect transistors.

FIG. 2 is shown with the second unit battery BAT2 and the third unit battery BAT3 as being the selected batteries for charging. That is, only the switching units T2_1, T4_2 of the second current input unit 12_1 and the third current output unit 14_2 are turned on, so as to form the current path only to the second unit battery BAT2 and the third unit battery BAT3. Thus, current path is only formed for the second unit battery BAT2 and the third unit battery BAT3 that need charging, and this can eliminate unnecessary electric energy being wasted and also prevent the other charged unit batteries from being overcharged.

As such, a person having ordinary skill in the art can understand that the present invention can be implemented in various other embodiments without substantially changing the technical concepts and the essential characteristics. Therefore, it should be understood that the embodiments described above are illustrative of the present invention and does not limit the scope of the present invention thereto. The scope of the present invention is represented by the claims shown below rather than the detailed description above, and the meaning and scope of the claims as well as all alterations and changes that can be derived from the equivalent concepts thereof are to be understood as being a part of the scope of the present invention.

What is claimed is:

1. A battery charging circuit for charging a plurality of unit batteries that are connected in series, the battery charging circuit comprising:
    a current path forming unit including a plurality of current input units coupled in parallel to each other and a plurality of current output units coupled in parallel to each other, each current input unit having a series coupling with a corresponding current output unit, each unit battery being coupled between the series couplings of a corresponding pair of current input and current output units, the current path forming unit forming a charging current path to one or more of the unit batteries selected by one or more selection signals;
    a control unit that senses a charging status of each of the unit batteries, and generates the selection signals and controls a duty ratio of a charging control pulse according to the charging statuses; and
    a charging electricity providing unit that controls a charging voltage provided to the charging current path forming unit according to the duty ratio of the charging control pulse.

2. The battery charging circuit of claim 1, wherein the charging current path forming unit further comprises:
    the plurality of current input units being connected to one terminal of the charging electricity providing unit and a positive terminal of each of the unit batteries; and
    the plurality of current output units being connected to another terminal of the charging electricity providing unit and a negative terminal of each of the unit batteries.

3. The battery charging circuit of claim 2, wherein each of the current input units comprise:
    a first switching unit that is connected to one terminal of the charging electricity providing unit and the positive terminals of the unit batteries and is controlled by the allocated selection signal among the plurality of the selection signals;
    a first parasitic diode that is connected between one terminal of the charging electricity providing unit and a first node; and
    a first diode that is connected between the first node and the positive terminal of the selected unit battery.

4. The battery charging circuit of claim 3, wherein each of the plurality of the current output units comprises:
    a second switching unit that is connected between the negative terminal of the unit battery selected for charging and the other terminal of the charging electricity providing unit and is controlled by an allocated selection signal among the plurality of the selection signals;
    a second parasitic diode that is connected between the second node and the negative terminal of the unit battery selected for charging; and
    a second diode that is connected between the second node and the other terminal of the charging electricity providing.

5. The battery charging circuit of claim 1, wherein the control unit comprises:
    a battery control unit that senses the charging state of each of the unit batteries and generates the selection signals according to the charging statuses; and
    a charging control pulse generation unit that controls the duty ratio of the charging control pulse according to the charging statuses sensed by the battery control unit.

6. The battery charging circuit of claim 1, wherein the charging electricity providing unit comprises:
    a first transistor that is connected between a first voltage terminal and a converter node and controlled by the first charging control pulse;
    a second transistor that is connected between the second voltage terminal and the converter node and is controlled by the first charging control pulse and a second charging control pulse;
    an inductor that is connected between the converter node and one terminal of the charging electricity providing unit; and
    a capacitor that is connected between one terminal of the charging electricity providing unit and the other terminal of the charging electricity providing unit.

7. The battery charging circuit of claim 1, wherein the plurality of unit batteries comprise rechargeable secondary batteries.

8. A battery charging circuit for charging a plurality of unit batteries that are connected in series, the battery charging circuit comprising:
   a charging current path forming unit including a plurality of current input units coupled in parallel to each other and a plurality of current output units coupled in parallel to each other, each current input unit having a series coupling with a corresponding current output unit, each unit battery being coupled between series couplings of a corresponding pair of current input and current output units, the charging current path forming unit forming a charging current path to one or more of the unit batteries selected according to one or more selection signals;
   a battery control unit that senses a charging state of each of the unit batteries and generates the one or more selection signals according to the charging states;
   a charging control pulse generation unit that controls a duty ratio of a charging control pulse according to the charging states sensed by the battery control unit; and
   a charge electricity providing unit that controls a voltage level of a charging voltage provided to the charging current path forming unit according to the duty ratio of the charging control pulse.

9. The battery charging circuit of claim 8, wherein the charging current path forming unit further comprises:
   the plurality of current input units being connected to one terminal of the charging electricity providing unit and the positive terminals of the unit batteries;
   the plurality of current output units being connected to the other terminal of the charging electricity providing unit and the negative terminals of the unit batteries.

10. The battery charging circuit of claim 9, wherein each of the plurality of current input units comprises:
    a first switching unit that is connected between one terminal of the charging electricity providing unit and the positive terminal of each of the unit batteries and is controlled by the allocated selection signal among the selection signals;
    a first parasitic diode that is connected between one terminal of the charging electricity providing unit and the first node; and
    a first diode that is connected between the first node and the positive terminal of the selected unit battery.

11. The battery charging circuit of claim 10, wherein each of the plurality of current output unit comprises:
    a second switching unit that is connected between the negative terminal of the selected battery and the other terminal of the charging electricity providing unit and is controlled by the allocated selected signal among the plurality of the selection signals;
    a second parasitic diode that is connected between the second node and the negative terminal of the selected unit battery; and
    a second diode that is connected between the second node and the other terminal of the charging electricity providing unit.

12. The battery charging circuit of claim 8, wherein the charging electricity providing unit comprises:
    a first transistor that is connected between the first voltage terminal and a converter node and controlled by a first charging control pulse;
    a second transistor that is connected between a second voltage terminal and the converter node and controlled by the first charging control pulse and a second charging control pulse that is inverse of the first charging control pulse;
    an inductor that is connected between the converter node and one terminal of the charging electricity providing unit; and
    a capacitor that is connected between one terminal the charging electricity providing unit and the other terminal of the charging electricity providing unit.

13. The battery charging circuit of claim 8, wherein the plurality of the unit batteries comprise secondary rechargeable batteries.

* * * * *